(12) United States Patent
Patel et al.

(10) Patent No.: US 10,511,571 B2
(45) Date of Patent: Dec. 17, 2019

(54) TECHNIQUES FOR SOLVING OVERHEARING PROBLEMS OF BODY AREA NETWORK MEDIUM ACCESS CONTROL PROTOCOLS

(75) Inventors: Maulin D. Patel, Tuckahoe, NY (US); Carlos M. Cordeiro, Portland, OR (US)

(73) Assignee: Koninklijke Philips N.V., Eindhoven (NL)

( * ) Notice: Subject to any disclaimer, the term of this patent is extended or adjusted under 35 U.S.C. 154(b) by 0 days.

(21) Appl. No.: 13/058,007

(22) PCT Filed: Aug. 7, 2009

(86) PCT No.: PCT/IB2009/053495
§ 371 (c)(1),
(2), (4) Date: Apr. 6, 2011

(87) PCT Pub. No.: WO2010/018519
PCT Pub. Date: Feb. 18, 2010

(65) Prior Publication Data
US 2011/0182223 A1    Jul. 28, 2011

Related U.S. Application Data

(60) Provisional application No. 61/087,744, filed on Aug. 11, 2008.

(51) Int. Cl.
*H01L 29/12* (2006.01)
*H04L 29/12* (2006.01)

(52) U.S. Cl.
CPC .... *H04L 61/6004* (2013.01); *H04L 29/12254* (2013.01); *H04L 29/12801* (2013.01);
(Continued)

(58) Field of Classification Search
CPC ......... H04L 29/12254; H04L 29/12801; H04L 61/2038; H04L 61/6004; H04L 29/12839; H04L 61/6022
(Continued)

(56) References Cited

U.S. PATENT DOCUMENTS 5,204,669 A    4/1993  Dorfe
5,606,313 A    2/1997  Allen
(Continued)

FOREIGN PATENT DOCUMENTS

CN    1889489 A    1/2007
CN    101087220 A    12/2007
(Continued)

OTHER PUBLICATIONS

Abdelmalik Bachir et al: "Micro-Frame Preamble MAC for Multihop Wireless Sensor Networks" Communications, 2006. ICC '06. IEEE International Conference on, IEEE, PI, Jun. 1, 2006 (Jun. 1, 2006), pp. 3365-3370, XP031025590.
(Continued)

*Primary Examiner* — Kan Yuen

(57) ABSTRACT

A method directed to overhearing problems of Body Area Network (BAN) medium access control protocols. The method comprises generating a preamble frame (S310); encoding a destination address of a target receiver device as a length of the preamble frame (S320); and transmitting the preamble frame (S330).

17 Claims, 4 Drawing Sheets

(52) U.S. Cl.
CPC .... *H04L 29/12839* (2013.01); *H04L 61/2038* (2013.01); *H04L 61/6022* (2013.01)

(58) Field of Classification Search
USPC .................. 370/311, 328, 338, 349; 455/502
See application file for complete search history.

(56) References Cited

U.S. PATENT DOCUMENTS

| | | | |
|---|---|---|---|
| 7,356,316 | B2 | 4/2008 | Ogiso |
| 2002/0097780 | A1 | 7/2002 | Odenwalder |
| 2004/0081127 | A1* | 4/2004 | Gardner et al. ............. 370/338 |
| 2004/0098512 | A1* | 5/2004 | Lin ............................... 709/249 |
| 2007/0135866 | A1* | 6/2007 | Baker et al. ..................... 607/60 |
| 2008/0256346 | A1* | 10/2008 | Lee et al. ....................... 712/239 |
| 2008/0285495 | A1* | 11/2008 | Wentink ............... H04W 12/02 370/311 |
| 2009/0103437 | A1* | 4/2009 | Kim et al. ..................... 370/235 |
| 2010/0189081 | A1* | 7/2010 | Zhang et al. ................. 370/336 |

FOREIGN PATENT DOCUMENTS

| | | |
|---|---|---|
| JP | 05095417 | 4/1993 |
| JP | 2006109325 | 4/2006 |
| JP | 2007013577 | 1/2007 |
| WO | WO9857463 A1 | 12/1998 |
| WO | WO2007031685 A1 | 3/2007 |

OTHER PUBLICATIONS

Sangsoon Lim et al: "An Ultra Low Power Medium Access Control Protocol with the Divided Preamble Sampling" Jan. 1, 2006 (Jan. 1, 2006), Ubiquitous Computing Systems Lecture Notes in Computer Science; LNCS, Springer, Berlin, DE, pp. 210-224, XP019045604.

Michael Buettner et al., "X-MAC: A Short Preamble Mac Protocol for Duty-Cycled Wireless Sensor Networks", ACM SenSys 2006.

El-Hoiydi et al., "WiseMAC: An Ultra Low Power MAC Protocol for the Downlink of Infrastructure Wireless Sensor Networks" Published in the Proceedings of the Ninth IEEE Symposium on Computers and Communication, ISCC'04, pp. 244-251, Alexandria, Egypt, Jun. 2004.

Joseph Polastre et al.,"Versatile Low Power Media Access for Wireless Sensor Networks", ACM SenSys, Nov. 2004, pp. 95-107.

* cited by examiner

TECHNIQUES FOR SOLVING OVERHEARING PROBLEMS OF BODY AREA NETWORK MEDIUM ACCESS CONTROL PROTOCOLS

This application claims the benefit of U.S. Provisional Application No. 61/087,744 filed on Aug. 11, 2008.

The invention generally relates to medium access control (MAC) protocols utilized in body area networks (BANs), and particularly to techniques for solving overhearing problems in such protocols.

A body area network (BAN) is primarily designed for permanent monitoring and logging of vital signs. An exemplary BAN shown in FIG. 1 includes multiple slave devices 120 which are typically sensors that can be either wearable or implanted into the human body. The slave devices 120 monitor vital body parameters and movements, and communicate with each other over a wireless medium. The slave devices 120 can transmit data from a human body to one or more master devices 130 from where the data can be forwarded, in real-time, to a hospital, clinic or elsewhere over a local area network (LAN), a wide area network (WAN), a cellular network, and the like.

One of the important factors in designing a BAN is the energy efficiency of slave devices 120 and/or master devices 130. Efficient energy consumption can be achieved by optimally duty cycling a receiver device (i.e., a device receiving data) between a listen state and a sleep state. The radio of a device is turned off when the device neither transmits nor receives data, thereby reducing the energy consumption of the device. A duty cycling is performed by a medium access control (MAC) protocol with the aim of minimizing idle listening and overhearing times, over emitting, collisions of data transmissions and controlling overhead which ultimately leads to power savings.

MAC duty cycling techniques include synchronous and asynchronous modes. In an asynchronous mode a sender device (i.e., a device transmitting data on the medium) and a listener device (i.e., a device listening to the medium) have independent sleep and awake times. Thus, an explicit synchronization mechanism, such as beacons is not required.

A preamble sampling technique is widely used in asynchronous duty cycling MAC protocols, such as WiseMAC, B-MAC and X-MAC. The WiseMAC is further described in "*WiseMAC: An Ultra Low Power MAC Protocol for the Downlink of Infrastructure Wireless Sensor Networks*," by El-Hoiydi, et al. published in the Proceedings of the Ninth IEEE Symposium on Computers and Communication, ISCC, pages 244-251, Alexandria, Egypt, June 2004. The B-MAC is described in "*Versatile Low Power Media Access for Wireless Sensor Networks*", ACM SenSys, Nov. 2004 by Polastre, et al., and the X-MAC protocol is published in "X-MAC: *A Short Preamble MAC Protocol for Duty-Cycled Wireless Sensor Networks*," ACM SenSys, 2006, by Buettner, et al.

As illustrated in FIG. 2, in the preamble sampling technique all the devices periodically listen to the medium for a short duration of time "$T_L$" and then return to a sleep state for the duration "$T_{CI}$", if the medium is idle. The time $T_{CI}$ between two successive listen times $T_L$ is a check interval. The combination of time intervals $T_{CI}$ and $T_L$ is a wake-up time interval. When a sender device has data to deliver, it transmits a wake-up (WUP) message (preamble) 210 that is longer than the check time interval $T_{CI}$ of a receiver device. In the preamble sampling technique a WUP message 210 carries only preambles and does not carry any other information. When a receiver device wakes-up, it senses the medium and detects the WUP message 210. This forces the receiver device to stay awake until the data is fully received and/or the medium becomes idle again.

Preamble sampling can be accomplished by a matched filter receiver which looks for a known preamble sequence in the received signal. Preamble sampling benefits from processing gain and repetition of a known symbol sequence, enabling reliable signal detection.

The length of the WUP message 210 must be longer than the check interval $T_{CI}$ to ensure that a receiver device is awake when actual data is transmitted. If a check interval $T_{CI}$ of a receiver device is very long, then WUP message transmissions can occupy the medium for a prolonged time, thereby preventing other devices from accessing the medium. Another disadvantage of the preamble sampling technique is that non-target neighbor devices overhear the WUP message 210 and stay awake until data transmission begins. As a result, the power consumption of devices in the network is increased.

To address the overhearing problem, the X-MAC protocol, referenced above, embeds identification (ID) of the target device (i.e., a destination address) into the WUP message. Thus, non-target neighboring devices can ascertain that they are not the intended receivers based on the ID and return to a sleep state. The problem with this approach is that the WUP signal contains data bits (i.e., a destination address) which are not known in advance. Therefore, the receiver must demodulate the WUP signal and decode the information to recover the destination address. A demodulation process is significantly more complex and consumes more energy than a preamble detection technique. In the preamble detection technique, the receiver device searches for a known sequence of symbols in the received signal.

Another technique for reducing the power consumption is to include two separate radios in a device, one is a low power wake-up (standby) radio and the other is a data communication radio. To wake up a receiver device, a sender device transmits a sufficiently strong signal (the "WUP signal"). The power of the WUP signal is above a predefined threshold. When the wake-up radio receives a WUP signal, it turns its data communication radio on, thus enabling the sender and receiver devices to communicate. The wake-up radio can be implemented using an energy detection technique which is simpler and more energy efficient than the preamble detection technique. However, this energy detection technique also suffers from the overhearing problem where neighboring non-target devices receive and wake up due to WUP signals that are not directed to them. Thus, when a sender device transits the WUP signal it is possible that all the neighboring devices wake up at the same time, although the signal was intended for only one device, whereby energy is wasted.

Therefore, it would be advantageous to provide a solution that solves the overhearing problems in BAN MAC protocols.

Certain embodiments of the invention include a method that comprises generating a preamble frame; encoding a destination address of a target receiver device as a length of the preamble frame; and transmitting the preamble frame.

Certain embodiments of the invention further include a method that comprises generating a wake-up signal; encoding a destination address of a target receiver device as a duration of the wake-up signal; and transmitting the wake-up signal.

The subject matter that is regarded as the invention is particularly pointed out and distinctly claimed in the claims at the conclusion of the specification. The foregoing and other features and advantages of the invention will be apparent from the following detailed description taken in conjunction with the accompanying drawings.

Figure 1:
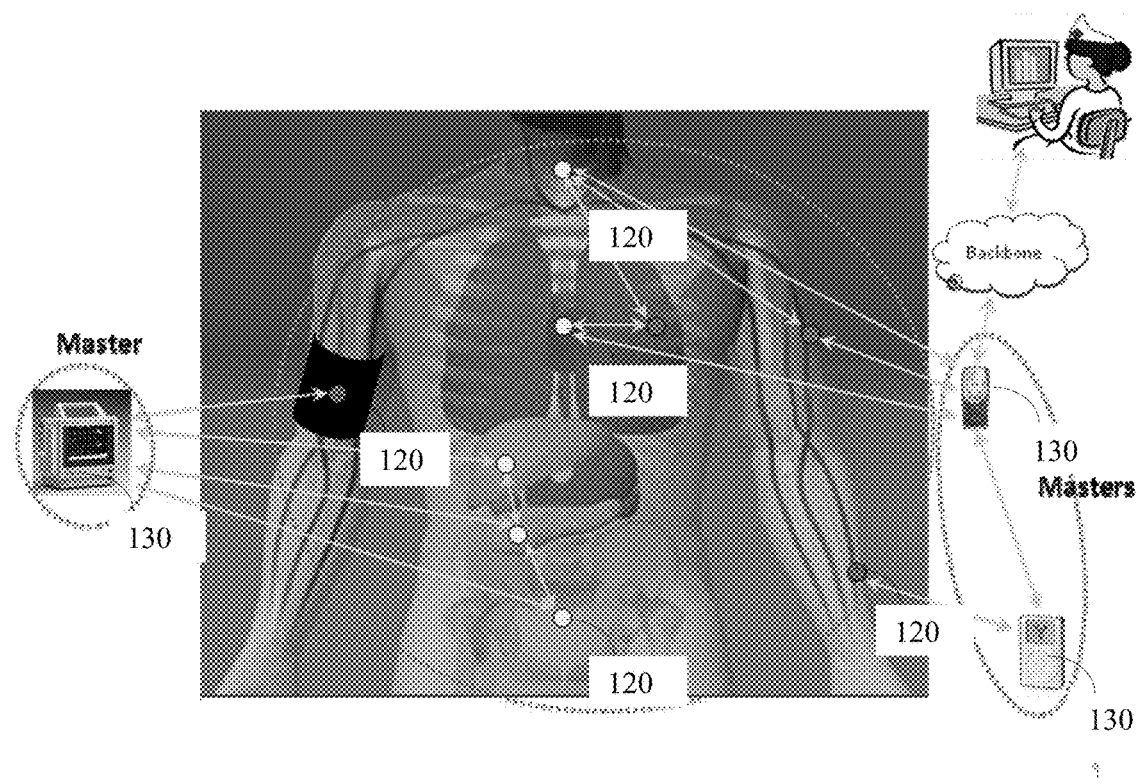
FIG. 1 is a schematic diagram of a body area wireless network.
Figure 2:
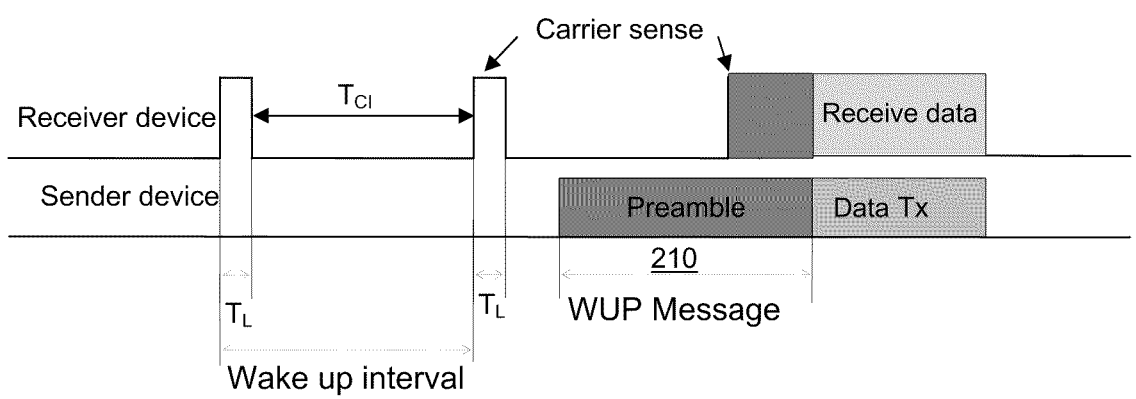
FIG. 2 is a diagram for illustrating the operation of a preamble sampling duty cycling technique.

It is important to note that the embodiments disclosed by the invention are only examples of the many advantageous uses of the innovative teachings herein. In general, statements made in the specification of the present application do not necessarily limit any of the various claimed inventions. Moreover, some statements may apply to some inventive features but not to others. In general, unless otherwise indicated, singular elements may be in plural and vice versa with no loss of generality. In the drawings, like numerals refer to like parts through several views.

In accordance with exemplary embodiments of the invention, the destination address of a target device is encoded as the size or length of the WUP message (i.e., a preamble frame). According to the length or size of the frame, a receiver device can determine whether it is the target of the WUP message without demodulating the entire frame. The destination of the WUP message is determined without invoking a demodulation process, thereby reducing the power consumption of a receiver device.

In accordance with another exemplary embodiment the destination address of a target device is encoded as the duration of time that a WUP signal should be transmitted, enabling devices having wake-up radios to turn on their data communication radio only when the data is directed to them.

Figure 3:
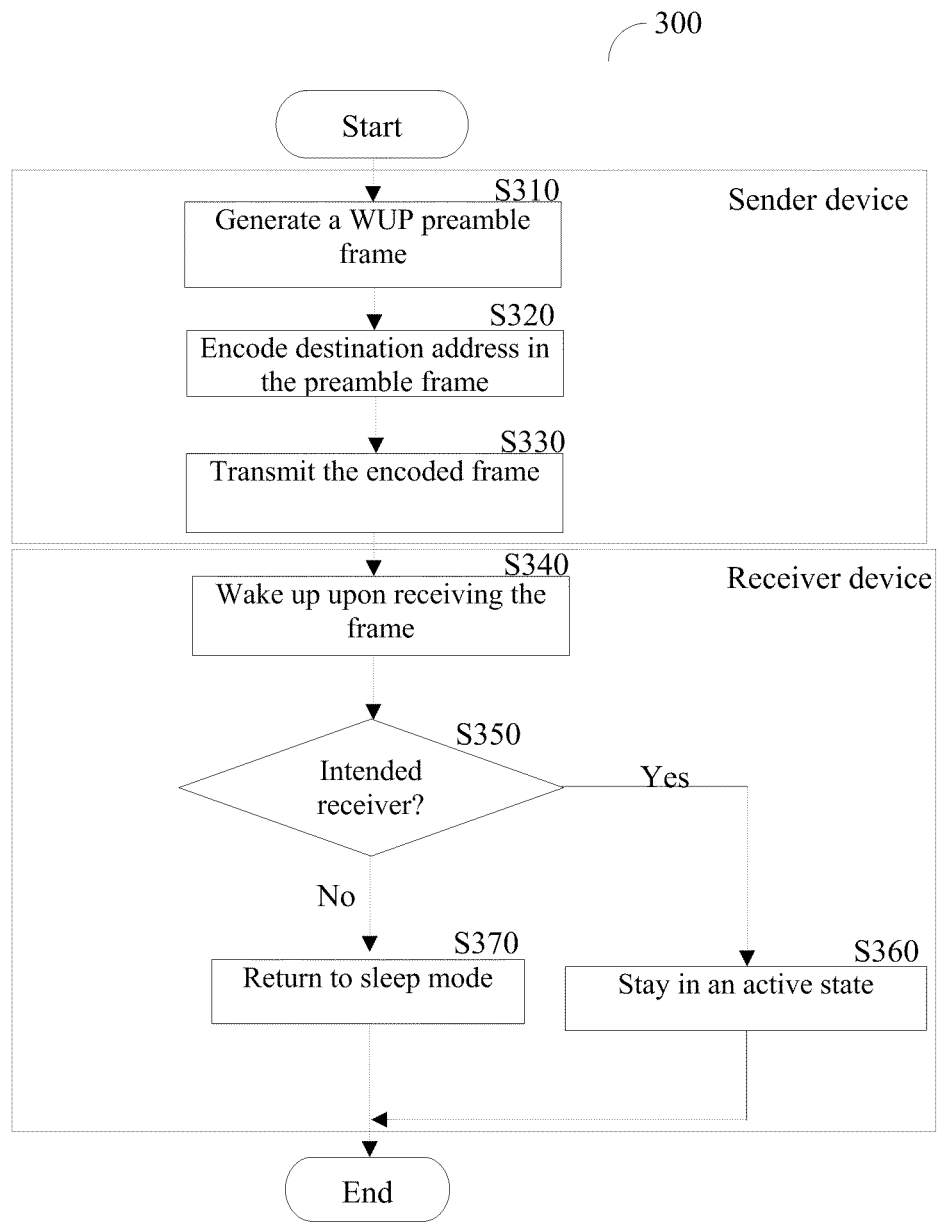
FIG. 3 is a flowchart for describing a method directed to the overhearing problems of BAN MAC protocols realized in accordance with one embodiment of the invention.

FIG. 3 shows a non-limiting and exemplary flowchart 300 for describing the method directed to the overhearing problems of BAN MAC protocols realized in accordance with one embodiment of the invention. The method is performed by at least two different devices that act as a receiver device and a sender device. It is appreciated that these functions can be executed by each device depending upon whether the device needs to send or receive data. In one embodiment the method is implemented as part of a BAN MAC protocol utilizing the preamble sampling technique discussed above.

At S310, a sender device generates a preamble frame (or a WUP message). The sender device may receive an instruction to generate such a frame from a higher layer (e.g., an application layer). At S320 the destination address of a target receiver device is encoded as the length of the preamble frame. In one embodiment of the invention the length of the preamble frame is determined as follows:

$$\text{Frame\_length}(x) = \text{Minimum\_length} + x; \quad (1)$$

where 'x' is the MAC/Network address of the target receiver device in a decimal notation. The Minimum_length is the smallest length frame that can be reliably detected by the receiver. The Minimum_length is a fixed value and is known to all the devices.

For example, if the Minimum_length is 1 unit and a MAC address of the destination is 0100 (0100 binary is a 4 decimal), then the Frame_length would be 5 units. Similarly, a MAC address 0111 can be encoded as a frame of length of 8 units.

In accordance with another embodiment of the invention, a hash function which converts a large data value into a small datum is used to derive a shorter address from a long address. For example, a hash function supplied with a 64-bit address as an input key can produce an 8-bit output address. Thus, the maximum length of the Frame_length can be bounded.

According to this embodiment, the length of the preamble frame is determined as follows:

$$\text{Frame\_length}(x) = \text{Minimum\_length} + \text{Hash}_1(x); \quad (2)$$

where 'x' is the MAC or network address of the target receiver device and $\text{Hash}_1$ is a hash function. All the devices use the identical hash function for this purpose. It should be noted that special control frames, such as broadcast frames may be encoded to a fixed known size.

In another embodiment of the invention, preamble frames can carry a start-of-frame delimiter and an end-of-frame delimiter, and the length of the time between these delimiters can represent the destination address.

At S330, the encoded preamble frame is transmitted over the wireless medium by the sender device. In certain embodiments, preamble frames transmitted by multiple transmitters on the same channel may overlap in time. To mitigate this effect, a sender device listens to the channel it intends to occupy and initiates the transmission only if the channel is found idle for a random duration.

Generally, a radio component of a BAN device is capable of operating on a range of frequency bands divided into logical channels. In order to minimize the chances of frame overlap and improve the scalability, another embodiment of invention selects the frequency channel for transmission (Frame_TX_Channel) based on the MAC or Network address of the intended recipient as follows:

$$\text{Frame\_TX\_Channel}(x) = \text{Hash}_2(x); \quad (3)$$

where 'x' is the MAC or Network address of the target receiver device and $\text{Hash}_2$ is a hash function. For example, if the radio is capable of operating on any one of 16 logical channels and MAC addresses are 64 bits long, then the $\text{Hash}_2$ function maps a 64-bit MAC address of a target receiver to 4-bit logical channel ID ranging from 0 to 15. As an example, the function $\text{Hash}_2$ may be: $\text{Hash}_2(x) = x$ modulo 16.

Each device in the network is configured with the length of a preamble frame and the logical channel ID corresponding to its MAC address. At S340 a receiver device wakes up, senses the medium, and detects the encoded preamble frame. In one embodiment, as the receiver wakes up, it tunes its radio to the logical channel selected using, for example, Equation (3). At S350 it is determined if the frame is intended for the receiver device by comparing the length of the frame to a length representing its MAC address. If the frame is a special control frame, the device checks whether the length of the frame corresponds to a fixed known length frame. If S350 results into a "Yes" answer, then at S360, the receiver device stays in an active state and starts receiving data; otherwise, at S370 the device returns to a sleep state without receiving the rest of the frame. For example, if the longest length frame a device expects to receive is 3 ms long, when the device wakes up and receives the preamble frame having length greater than 3 ms, the device concludes that the frame is not addressed to the device, and the device can go back to sleep without waiting to receive the rest of the frame, thereby saving power.

In one embodiment of the invention, the above technique can also be applied to data frames. The preamble length or size of the data frame can be determined based on the above teachings. Thus, from the size of the preamble a receiver can determine if it is the target receiver. If the receiver device concludes that it is indeed the target receiver, the device can start to demodulate the data frame. Since a preamble sampling process is more energy efficient then a demodulation process, a significant amount of energy can be saved.

In accordance with another embodiment of the invention, the teachings disclosed herein can be implemented in a BAN MAC protocol utilizing the wake-up radio technique. In accordance with this embodiment, the WUP signal is encoded such that the duration of time that the signal is transmitted corresponds to the MAC address of a target receiver device. The encoding function may be defined according to Equation (1) or (2) above. In accordance with another embodiment of the invention, the transmitter may transmit a WUP signal on a channel selected according to Equation (3) above.

A receiver device is configured with a reception channel ID and reception time of the WUP signal where both are based on its MAC address. For example, the reception time may be determined using Equation (1) or (2) and the reception channel ID may be determined using Equation (3). If the receiver device senses the WUP signal (i.e., a power level of the signal is above a predefined threshold) for a duration equal to the reception time on the reception channel, then the device stays in an active state and turns on its data communication radio; otherwise, the device returns to a sleep state. It will be appreciated that this technique may significantly reduce the power consumption of devices having separate radios, as devices do not turn on their data communication radio when overhearing WUP signals.

Figure 4:
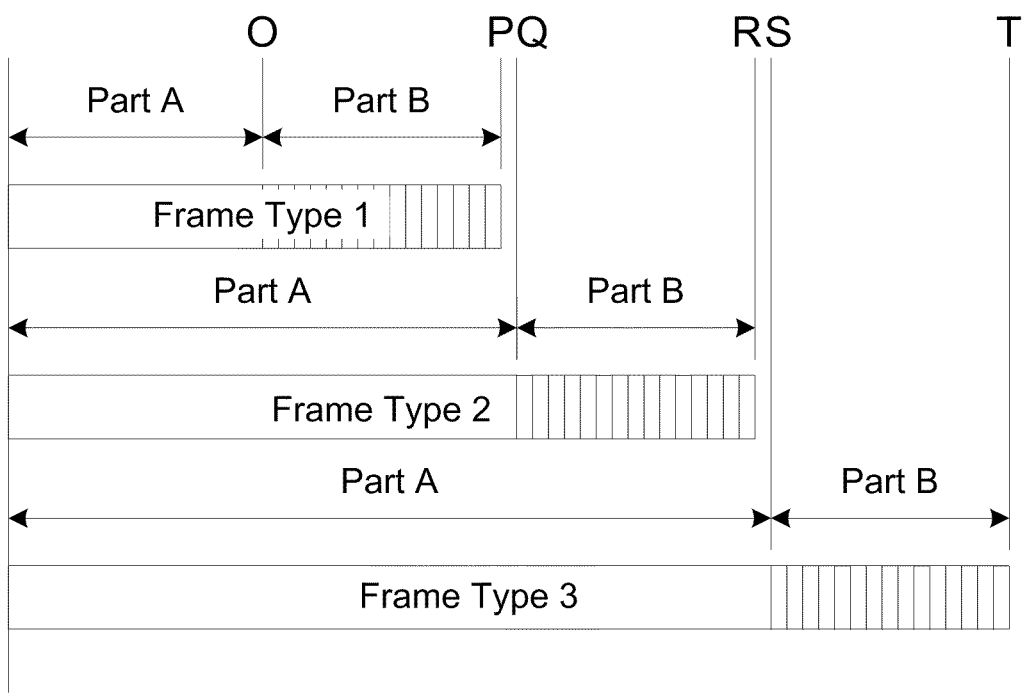
FIG. 4 is a diagram for illustrating a multiple-level encoding method realized in accordance with one embodiment of the invention.

Certain embodiments of the invention also include a method for encoding other types of information in addition to the destination address. For example, a source address of a sender device may also be encoded in a frame. The encoding function to encode multiple levels of information is as follows:

$$\text{Frame\_length}(a,b) = \text{Fixed\_length}(a) + \text{Hash}(b) \quad (4)$$

where 'a' is the frame type, and 'b' is encoded information. As illustrated in FIG. 4, each frame has two parts. Part A is a function of the frame type (e.g., a control frame, a data frame, a WUP frame, etc.), and Part B is the function of the encoded information. It should be noted that frame lengths of different frame types are mutually disjoint. Upon receipt of the frame the receiver determines the length L of the frame. For example: if $L \in [O,P]$, then the frame type is 1; if $L \in [Q,R]$, then the frame type is 2; and if $L \in [S,T]$, then the frame type is 3. Additionally, by decoding the length of the Part B, the encoded information is recovered. The values of parameters O, P, S, T are known a-priori.

The principles of the invention may be implemented in hardware, software, firmware or any combinations thereof. The software may be implemented as an application program tangibly embodied on a program storage unit or computer readable medium. The application program may be uploaded to, and executed by, a machine comprising any suitable architecture, for example a computer platform having hardware such as one or more central processing units ("CPUs"), a random access memory ("RAM"), and input/output ("I/O") interfaces. The computer platform may also include an operating system and microinstruction code. The various processes and functions described herein may be either part of the microinstruction code or part of the application program, or any combination thereof, which may be executed by a CPU, whether or not such computer or processor is explicitly shown.

It is to be further understood that, because some of the constituent system components and methods depicted in the accompanying drawings are preferably implemented in software, the actual connections between the system components or the process function blocks may differ depending upon the manner in which the present invention is programmed. Given the teachings herein, one of ordinary skill in the pertinent art will be able to contemplate these and similar implementations or configurations of the present invention.

All examples and conditional language recited herein are intended for pedagogical purposes to aid the reader in understanding the principles of the invention and the concepts contributed by the inventor to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

What is claimed is:

1. A method for communicating between a sender device and multiple receiver devices in a network, comprising:
    generating, in a sender device, a preamble frame;
    encoding a destination address of a target receiver device in the preamble frame using a mathematical relationship between a length of the preamble frame and the destination address of the target receiver device in order to allow a receiver device to determine whether it is the target receiver device by comparing the length of the preamble frame to the destination address, wherein the mathematical relationship is further based on a smallest length frame that can be reliably detected by the receiver device; and
    transmitting the preamble frame.

2. The method of claim 1, wherein the mathematical relationship further comprises summing the smallest length frame that can be reliably detected by the receiver device and a decimal value of the destination address.

3. The method of claim 1, wherein the mathematical relationship further comprises summing the smallest length frame that can be reliably detected by the receiver device and a hash value computed by a hash function, and wherein the destination address is an input key of the hash function.

4. The method of claim 1, further comprising selecting a frequency channel further by applying a hash function to map the destination address to an identification number of a logical channel.

5. The method of claim 1, wherein the destination address is at least a medium access control address utilized in a body area network.

6. The method of claim 1, further comprising encoding multiple levels of information as the length of the preamble frame.

7. The method of claim 6, wherein the encoded preamble frame comprises multiple parts, the length of each part being encoded to represent a specific type of information.

8. A method for communicating between a sender device and multiple receiver devices via a network, comprising:

generating, in a sender device, a wake-up signal;
encoding a destination address of a target receiver device in the wake-up signal using a mathematical relationship between a duration of the wake-up signal and the destination address of the target receiver device in order to allow a receiver device to determine whether it is the target receiver device by comparing the duration of the wake-up signal to the destination address, wherein the mathematical relationship is further based on a smallest duration of the wake-up signal that can be reliably detected by the receiver device; and
transmitting the wake-up signal.

9. The method of claim 8, wherein the mathematical relationship further comprises summing the smallest duration of the wake-up signal that can be reliably detected by the receiver device and a decimal value of the destination address.

10. The method of claim 8, wherein the mathematical relationship further comprises summing the smallest duration of the wake-up signal that can be reliably detected by the receiver device and a hash value computed by a hash function, and wherein the destination address is an input key of the hash function.

11. The method of claim 8, wherein the destination address is at least a medium access control address utilized in a body area network.

12. The method of claim 8, further comprising encoding multiple levels of information as the duration of the wake-up signal.

13. The method of claim 12, wherein the encoded wake-up signal comprises multiple parts, the length of each part being encoded to represent a specific type of information.

14. The method of claim 8, further comprising selecting a frequency channel for transmitting the wake-up signal by applying a hash function to map the destination address to an identification number of a logical channel.

15. A wireless device operable in a body area network, comprising:
a radio transceiver configured to receive and transmit radio signals over a medium of the body area network;
a processor; and
a memory configured for storing instructions that, when executed, configure the processor to:
generate a preamble frame; and
encode a destination address of a target receiver device in the preamble frame
using a mathematical relationship between a length of the preamble frame and the destination address of the target receiver device in order to allow a receiver device to determine whether it is the target receiver device by comparing the length of the preamble frame to the destination address, wherein the mathematical relationship is further based on a smallest length frame that can be reliably detected by the receiver device.

16. The wireless device of claim 15, wherein the preamble frame includes a wake-up signal.

17. The wireless device of claim 15, wherein the processor is further configured to select a frequency channel for transmitting the preamble frame by applying a hash function to map the destination address to an identification number of a logical channel.

* * * * *